US012657932B2

(12) United States Patent
Thornton et al.

(10) Patent No.: US 12,657,932 B2
(45) Date of Patent: Jun. 16, 2026

(54) ANOMALOUS ROAD SIGNS

(71) Applicant: NETRADYNE, INC., San Diego, CA (US)

(72) Inventors: Matthew Thornton, San Diego, CA (US); Venkata Sreekanta Reddy Annapureddy, San Diego, CA (US); David Jonathan Julian, San Diego, CA (US); Arvind Yedla, La Jolla, CA (US)

(73) Assignee: NETRADYNE, INC., San Diego, CA (US)

( * ) Notice: Subject to any disclaimer, the term of this patent is extended or adjusted under 35 U.S.C. 154(b) by 285 days.

(21) Appl. No.: 18/287,801

(22) PCT Filed: Apr. 22, 2022

(86) PCT No.: PCT/US2022/025908

§ 371 (c)(1),
(2) Date: Oct. 20, 2023

(87) PCT Pub. No.: WO2022/226283

PCT Pub. Date: Oct. 27, 2022

(65) Prior Publication Data

US 2024/0193960 A1     Jun. 13, 2024

Related U.S. Application Data

(60) Provisional application No. 63/178,525, filed on Apr. 22, 2021.

(51) Int. Cl.
*G06V 20/58* (2022.01)
*G06V 10/774* (2022.01)
(Continued)

(52) U.S. Cl.
CPC .......... *G06V 20/582* (2022.01); *G06V 10/774* (2022.01); *G06V 10/776* (2022.01); *G06V 10/82* (2022.01)

(58) Field of Classification Search
CPC .... G06V 20/582; G06V 10/82; G06V 10/774; G06V 10/776
See application file for complete search history.

(56) References Cited

U.S. PATENT DOCUMENTS

| | | | | |
|---|---|---|---|---|
| 10,830,605 B1 * | 11/2020 | Chintakindi | ....... | G01C 21/3461 |
| 11,770,505 B1 * | 9/2023 | Nguyen | .................. | H04N 7/18 |
| | | | | 348/148 |

(Continued)

FOREIGN PATENT DOCUMENTS

WO     2017123665 A1     7/2017

OTHER PUBLICATIONS

International Search Report and Written Opinion in International Patent Application No. PCT/US2022/025908 dated Jul. 15, 2022 (14 pages).

*Primary Examiner* — David Perlman
(74) *Attorney, Agent, or Firm* — Michael Campos

(57) ABSTRACT

Systems and methods are provided for detecting and classifying driving behaviors, as well as techniques for improving such systems and methods, which may include identifying geographic locations where anomalous rates of non-compliant driving behaviors are observed, such as in the vicinity of certain traffic signs, traffic lights, and road markings.

17 Claims, 12 Drawing Sheets

(51) Int. Cl.
_G06V 10/776_ (2022.01)
_G06V 10/82_ (2022.01)

(56) References Cited

U.S. PATENT DOCUMENTS

| | | | |
|---|---|---|---|
| 2018/0025636 A1 | 1/2018 | Boykin et al. | |
| 2019/0265712 A1* | 8/2019 | Satzoda ................ | B60W 40/09 |
| 2020/0074326 A1 | 3/2020 | Balakrishnan et al. | |
| 2020/0079387 A1 | 3/2020 | Krishna et al. | |
| 2020/0097741 A1* | 3/2020 | Takeyasu ........... | H04N 1/00172 |

* cited by examiner

ANOMALOUS ROAD SIGNS

CROSS REFERENCE TO RELATED APPLICATIONS

Field

This application is a U.S. National Phase Application under 35 U.S.C. § 371 of International Patent Application No. PCT/US22/25908, filed on Apr. 22, 2022, which claims the benefit of and priority to U.S. Provisional Patent Application No. 63/178,525, filed on Apr. 22, 2021, and entitled ANOMALOUS ROAD SIGNS, the contents of which are incorporated herein by reference in their entireties.

BACKGROUND

Field

Certain aspects of the present disclosure generally relate to internet-of-things (IOT) applications, and more particularly, to systems and methods of detecting and classifying driving behaviors, as well as techniques for improving such systems and methods, which may include identifying geographic locations where anomalous rates of non-compliant driving behaviors are observed, such as in the vicinity of certain traffic signs, traffic lights, road markings, and the like.

Background

Internet-of-things (IOT) applications may include embedded machine vision for intelligent driver monitoring systems (IDMS), advanced driving assistance systems (ADAS), autonomous driving systems, camera-based surveillance systems, smart cities, and the like. For some applications, such as an IOT application that measures driving behaviors, a user may need to measure the accuracy of an IOT application in a real-world deployment. A user of such an IOT system may consider it necessary to review substantially all of the data captured by the sensors of one or multiple connected devices to ensure a satisfactory degree of accuracy. It may be impractical, however, to review a quantity of data that could provide sufficient assurance of system accuracy. In another example, a user may wish to use IOT application measurements to construct useful semantic maps of an environment that may be relied on by other systems, such as other IOT systems, or systems that inform city planning. In such applications, failures to properly detect driving scenarios or analyze driving behaviors in substantially all driving scenarios and at all locations may lead to unnecessary expenses, or in some cases, unexpected consequences.

The present disclosure is directed to systems, methods, and computer program products that may overcome challenges associated with systems that measure driving behaviors or that rely upon measurements of driving behaviors, such as IDMS, ADAS, autonomous driving systems. Accordingly, certain aspects of the present disclosure are directed to improving the accuracy of systems that measure driving behaviors.

SUMMARY

Certain aspects of the present disclosure generally relate to providing, implementing, and using a method of identifying anomalous road signs and other traffic control devices.

As used herein, anomalous road signs may refer to particular road signs and locations at which drivers may be observed to exhibit driving behaviors that are atypical in comparison with road signs of the same type that are placed at other locations. For example, such driving behaviors may be characterized as non-compliant at an unusually high frequency at certain locations where a traffic control device is installed. Anomalous traffic control devices may refer to traffic control devices, such as a traffic light at a particular intersection, at which drivers may be observed to exhibit driving behaviors that are atypical in comparison to traffic control devices of the same type at other locations.

According to certain aspects, anomalous road signs, or more generally anomalous traffic control devices, may be identified based on the observations of many driving behavior monitoring devices. Observations made in the vicinity of anomalous traffic control devices may be preferentially selected for additional processing. The selected observations may include examples that indicate event comprehension failure of the driving behavior monitoring devices. Alternatively, the selected observations may include examples that indicate that unusually high rates of non-compliance with the associated traffic control device. For example, a traffic control device that is located on private property may be routinely ignored by the owner of the private property, even though the owner expects that visitors to the property will comply with the traffic sign. Certain disclosed systems and methods include techniques to identify frequently violated traffic control devices, including road signs, which may be useful for driver safety applications, smart cities, and the like.

Certain aspects of the present disclosure provide a method to identify anomalous traffic control devices or locations. The method generally includes determining a group compliance score for a driver group of a plurality of driver groups; determining a location non-compliance score for a geographic location, wherein the geographic location is associated with a driving scenario; selecting, based on the group compliance score and the location non-compliance score, image data associated with the geographic location; and storing the image data in a machine learning database.

Certain aspects of the present disclosure provide a computer program product for identifying anomalous traffic control devices or locations. The computer program product generally includes a non-transitory computer-readable medium having program code recorded thereon, the program code comprising program code to determine a group compliance score for a driver group of a plurality of driver groups; determine a location non-compliance score for a geographic location, wherein the geographic location is associated with a driving scenario; select, based on the group compliance score and the location non-compliance score, image data associated with the geographic location; and store the image data in a machine learning database.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Vehicle Mounted Camera Device

Figure 1A:
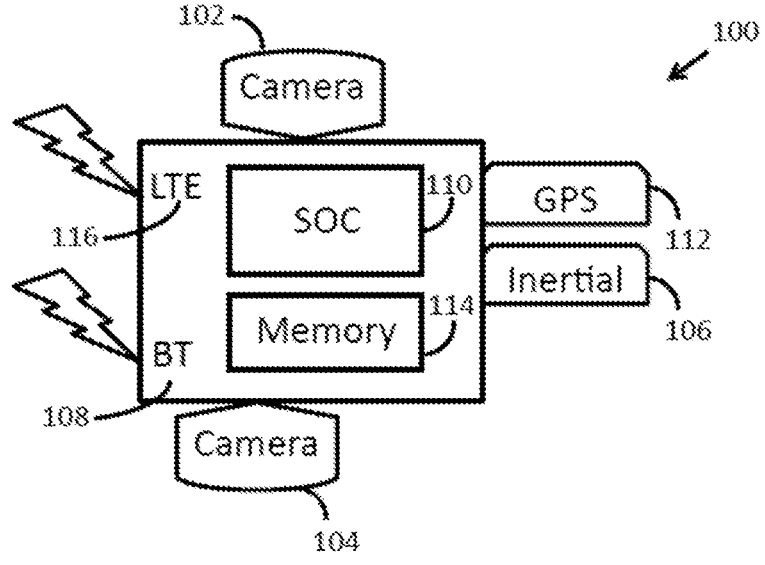
FIG. 1A illustrates an example of a system to identify anomalous road signs in accordance with certain aspects of the present disclosure.

FIG. 1A illustrates an embodiment of the aforementioned system for identifying anomalous road signs. The device 100 may include input sensors (which may include a forward-facing camera 102, a driver facing camera 104, connections to other cameras that are not physically mounted to the device, inertial sensors 106, car OBD-II port sensor data (which may be obtained through a Bluetooth connection 108), and the like) and compute capability 110. The compute capability may be a CPU or an integrated System-on-a-chip (SOC), which may include a CPU and other specialized compute cores, such as a graphics processor (GPU), gesture recognition processor, and the like. In some embodiments, a system for identifying anomalous road signs may include wireless communication to cloud services, such as with Long Term Evolution (LTE) 116 or Bluetooth communication 108 to other devices nearby. For example, the cloud may provide real-time analytics assistance. In an embodiment involving cloud services, the cloud may facilitate aggregation and processing of data for offline analytics. The device may also include a global positioning system (GPS) either as a separate module 112 or integrated within a System-on-a-chip 110. The device may further include memory storage 114.

A system for identifying anomalous road signs, in accordance with certain aspects of the present disclosure, may assess the driver's behavior in real-time. For example, an in-car monitoring system, such as the device 100 illustrated in FIG. 1A that may be mounted to a car, may perform analysis in support of a driver behavior assessment in real-time, and may determine a cause or potential causes of traffic events as they occur. In this example, the system, in comparison with a system that does not include real-time processing, may avoid storing large amounts of sensor data since it may instead store a processed and reduced set of the data. Similarly, or in addition, the system may incur fewer costs associated with wirelessly transmitting data to a remote server. Such a system may also encounter fewer wireless coverage issues.

Figure 1B:
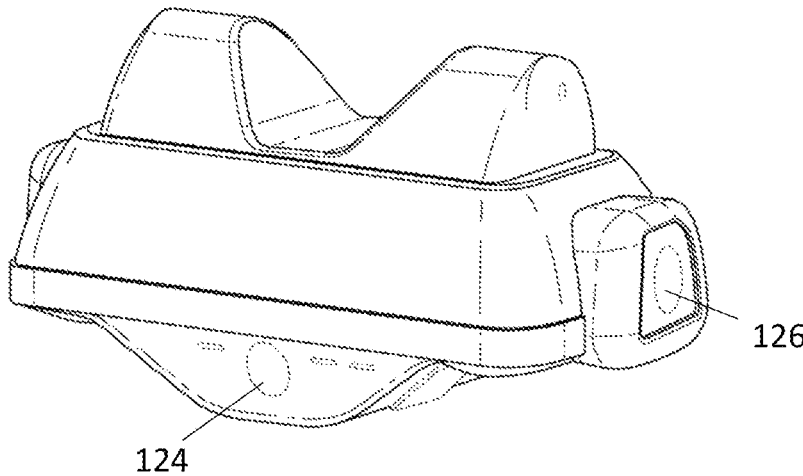
FIG. 1B illustrates an example of a system to identify anomalous road signs in accordance with certain aspects of the present disclosure.

FIG. 1B illustrates an embodiment of a device with four cameras in accordance with the aforementioned devices, systems, and methods of identifying anomalous road signs. FIG. 1B illustrates a front-perspective view. The device illustrated in FIG. 1B may be affixed to a vehicle and may include a front-facing camera aperture through which an image sensor may capture video data (e.g., frames or visual data) from the road ahead of a vehicle (e.g., an outward scene of the vehicle). The device may also include an inward-facing camera aperture 124 through which an image sensor may capture video data (e.g., frames or visual data) from the internal cab of a vehicle. The inward-facing camera may be used, for example, to monitor the operator/driver of a vehicle. The device may also include a right camera aperture 126 through which an image sensor may capture video data from the right side of a vehicle operator's Point of View (POV). The device may also include a left camera aperture through which an image sensor may capture video data from the left side of a vehicle operator's POV. The right camera aperture and left camera aperture 126 may capture visual data relevant to the outward scene of a vehicle (e.g., through side windows of the vehicle, images appearing in side-view mirrors, etc.) and/or may capture visual data relevant to the inward scene of a vehicle (e.g., a part of the driver/operator, other objects or passengers inside the cab of a vehicle, objects or passengers with which the driver/operator interacts, etc.)

Intelligent Pre-Selection

Machine learning based systems require data for learning. The cost of transmitting and storing the data that is desired for a machine learning system may be prohibitive. For instance, in an IDMS (Intelligent Driving Monitoring System), a device recording video at 1080p resolution may be generating upwards of 30 MB of data per minute. Transmitting all of this data over a wireless link may be prohibitively expensive and may not even be feasible at certain locations. Moreover, once transmitted, storing all of this data at the cloud may be prohibitively expensive.

In some situations, data recorded at different times may have different amount of relevance for training. For instance, if the system needs to train for driving during rain then transmitting the data during sunny days may be less useful. In another example, the system may be configured to train on traffic lights. In this case, videos with no traffic lights may be less useful than videos that have traffic lights. According to certain aspects of the present disclosure, the device may use 'filters' to decide which data should be transmitted to the cloud. These filters may have both a high precision and recall. In some embodiments, precision and recall may be subject to a user-defined trade-off.

For instance, a filter with high precision but poor recall may conserve bandwidth but may also miss some important events. A filter with low precision and high recall may be less bandwidth efficient but may capture more of the desired events. Continuing with the example of traffic lights, the device may run a DNN engine that may have low precision and high recall for detecting traffic light. Even with a low precision, this network may enable a system to be more bandwidth efficient than one that transmits all the video to the cloud. In this example, an artificial neural network trained with raw video feed may have poor precision for traffic light detection since traffic lights may be infrequent in typical driving scenarios. By transmitting and then labeling videos likely to contain traffic lights, the DNN's performance detecting rare objects such as traffic lights (which may be rarely encountered by interstate truckers, for example) may be improved.

Certain aspects of the present disclosure are directed to the selective storage of data in a machine learning database based on a determination that the geographic location where the data were recorded is associated with an unusually high rate of observations of non-compliant driving behaviors. As explained below, by transmitting, reprocessing (or manually reviewing), and then storing videos recorded at such geographic locations, a machine learning database may be updated to include rich training examples that may addresses weaknesses of a machine learning model in a focused manner. In some cases, such a selective augmentation of a machine learning database may push performance of machine learning systems that are trained on that database beyond levels that could otherwise be achieved with a less selective approach.

Distributed Video Search

Certain aspects of the present disclosure are directed to searching visual data, such as video streams and images, captured at one or more devices. The number of devices may be denoted as N. The value of N may range from one (a single device) to billions. Each device may be capturing one or more video streams, may have captured one or more video streams, and/or may capture one or more video streams in the future. It may be desired to search the video streams in a number of these devices. In one example, a user may desire to search all of the captured video streams in all of the N devices. In another example, a user may desire to search a portion of the video captured in a portion of the N devices. A user may desire, for example, to search a representative sample of devices in an identified geographical area. Alternatively, or in addition, the user may desire to search the video captured around an identified time.

A search query may include an indication of specific objects, objects having certain attributes, and/or a sequence of events. Several systems, devices, and methods of detecting objects and events (including systems and methods of detecting safe and unsafe driving behaviors as may be relevant to an IDMS system) are contemplated, as described in PCT application PCT/US17/13062, entitled DRIVER BEHAVIOR MONITORING, filed 11 Jan. 2017, which is incorporated herein by reference in its entirety.

Examples of distributed video search may include an intelligent driver monitoring system (IDMS), where each vehicle has an IDMS device and the user/system may search and retrieve 'interesting' videos for training/coaching purposes. An example of 'interesting' videos in this context may be videos in which there is visible snow, videos in which there are visible pedestrians, videos in which there are visible traffic lights, or videos corresponding to certain patterns of data on non-visual sensors. Examples of patterns of data in non-visual sensors may include inertial sensor data corresponding to a specified acceleration or braking pattern. Other examples of non-visual sensory may include system monitoring modules. A system monitoring module may measure GPU utilization, CPU utilization, memory utilization, temperature, and the like. In some embodiments, a video search may be based solely on data from non-visual sensors, which may be associated with video data. Alternatively, or in addition, a video search may be based on raw, filtered, or processed visual data. Several systems, devices, and methods of distributed video storage and search are contemplated, as described in PCT application PCT/US2017/045932, entitled DISTRIBUTED VIDEO STORAGE AND SEARCH WITH EDGE COMPUTING, filed 8 Aug. 2017, which is incorporated herein by reference in its entirety.

In addition, in accordance with certain aspects of the present disclosure, upon determining that a certain geographic location is associated with an unusually high rate of observations of non-compliant driving behaviors, a distributed video search may be formulated to query a distributed network of devices for video and or other data from the geographic location.

Distributed Video Search for Rare Event Example Mining

Certain aspects of the present disclosure may be directed to visual search that is based on certain objects or events of interest without regard to the location where they were collected. Likewise, a search query may request examples of a particular pattern in visual data and may further request that the examples represent a range of geographical locations.

While machine learning has been advancing rapidly in recent years, one hindrance to progress has been the availability of labeled data. In safety-critical applications such as autonomous driving, for example, a particular issue relates to the availability of data that reflects rare but important events. Rare but important events may be referred to as "corner cases." Control systems may struggle to adequately deal with such events because of the paucity of training data. Accordingly, certain aspects of the present disclosure may be directed to more rapidly identifying a set of training images or videos for a training sample in the context of computer vision development.

In one example, it may be desirable to automatically detect when a driver weaves in and out of lanes of traffic in an aggressive and unsafe manner. A deep learning model may be trained to detect such activity from a set of labeled videos captured at cars at times that the driver changed lanes frequently.

A weaving behavior detection model may be formulated and deployed on devices that are connected to cameras in cars. The device may be configured to detect that a driver has made multiple lane changes in a manner that could be unsafe. In the early development of the detection model, there may be many false alarms. For example, lane changes may be incorrectly detected, or the pattern of lane changes may actually correspond to a safe and normal driving behavior. In one approach to developing such a detection model, a set of devices with the deployed model may transmit detects (both true and false) to a centralized server for a period of two weeks. Based on the received detections, the model may be iteratively refined and re-deployed in this manner.

In addition, or alternatively, in accordance with certain aspects of the present disclosure, a weaving behavior detection model may be deployed on devices. Rather than wait for two weeks, however, the weaving model could be made part of a search query to each of the devices. Upon receiving the search query, each device may reprocess its local storage of data to determine if there have been any relevant events in the recent past. For example, the device may have a local storage that can accommodate 2-4 weeks of driving data. In comparison to the first approach described above which had 2-week iteration cycles, this approach using distributed video search on the locally stored data of edge devices could return example training videos within minutes or hours.

Likewise, subsequent iterations of the detection model may be deployed as search requests to a non-overlapping set of target devices. In this way, each two-week cycle of machine learning development could substantially eliminate the time associated with observing candidate events.

Furthermore, rather than re-processing all of the video stored on each local device, the search query may be processed based on stored descriptors, as described above. Likewise, a search query may entail re-processing a sample of the locally stored videos, in which the subsample may be identified based on a search of the associated descriptor data.

Furthermore, according to certain aspects, a search query may entail detecting a target driving behavior, such as weaving, but specifically at one or more pre-defined geographic locations where the detection of the driving behavior is anomalous. For example, a geographic location that has an unusually high incidence of weaving may be a location where temporary traffic control devices guide drivers to make multiple lane changes in quick succession. Such situations may be considered examples in which the typical rules of road are overridden by a temporary change to a driving environment. By selectively searching for and then storing examples from such a location and other similarly anomalous locations, a machine learning model may be trained to recognize the hallmarks of such examples. This, in turn, may enable proper characterization of driving behaviors at other locations when the typical rules of the road are similarly overridden.

Anomalous Road Sign Detection

According to certain aspects of the present disclosure, by identifying locations having unusually high rates of observed non-compliant driving behaviors and then storing image data associated with those locations into a machine learning database, precision and recall of a driving behavior monitoring system may improve. The precision and recall may be expected to improve because at least some of the observations of non-compliant driving behavior may be expected to be erroneous. Furthermore, for at least at some geographic locations, the causes of an erroneous observation of non-compliant driving behavior by a driving behavior monitoring system may be rooted in peculiarities of the geographic location, such as an unusual placement of a traffic control device. In such cases, repeated observations of driving behaviors at the location may provide multiple views of the peculiarities of the location, which in turn may provide sufficient training data for the system to overcome whatever limitations of the driver behavior monitoring system are revealed by those peculiarities. Over time, for locations at which the observations of non-compliant driving behaviors were frequently erroneous, a system that is trained on stored examples may make fewer errors. As a consequence, the driving behavior monitoring system may make fewer observations of non-compliant behavior, and in turn, there location may no longer be associated with unusually high rates on observations of non-compliant behavior.

A location may be identified as having an unusually high rate of observed non-compliant driving behaviors if, for example, those observations are made regarding drivers who otherwise tend to exhibit compliant driving behaviors in other locations. Locations identified on the basis of overall compliance rates of a driver group may be more likely to yield events that were erroneously characterized.

In some embodiments, the data that is stored from an identified location may have been collected from a vehicle driven by a driver in an identified driving group. In contrast, in some embodiments, the data that is stored from an identified location may be recorded from devices in other vehicles that are not associated with the driver group. Alternatively, or in addition, data that is stored from an identified location may be captured from a data source that is not associated with a driving monitoring system. For example, for some types of erroneous classifications of non-compliant behavior, the cause of the error might relate to features of the geographic location that may be detected from an overhead view, such as from a satellite, low-altitude plane, drone, or a fixed camera in the vicinity.

In certain embodiments, a system may ignore (not select for storage) data that is collected at locations associated with a high rate of non-compliance if the determination that the location is associated with a high rate of non-compliance is made based on driving data from a group of drivers that tends to have elevated rates of non-compliant driving across locations. In these cases, selection of event data from any particular driving location may be no more likely to yield false positive event classifications.

By focusing resources on locations and from driver groups that are expected to yield more false positives, a system may create a machine learning database that represents a large diversity of challenging corner cases, but at the same time is not overwhelmed by true positive examples which will become more frequently as the associated machine learning systems that are trained on that database achieves higher and higher levels of performance. Repeated application of certain aspects of the present disclosure, therefore, may continue to improve such systems as they encounter increasingly challenging cases on the long-tail distribution of traffic phenomena.

Aspects of the present disclosure may also improve the accuracy of semantic mapping that are based on deployed IOT systems. As driving behavior monitoring systems improve and are able to properly analyze driving behaviors in more challenging locations, the coverage of the semantic map (the area of which the semantic map may be sufficiently precise) may continue to increase.

As an example of the above description, in certain embodiments anomalous driving behavior in the vicinity of a stop sign may be detected. A location having an unusually high prevalence of non-compliant stop sign behavior may be inferred from aggregated observations. In this example, detection of anomalous stop sign behavior may refer to a crowd-sourced technique whereby stop sign behavior is observed across a number of vehicles and drivers. Normal, or average, stop sign behavior may be determined over a period of time. It may be determined for example, that on average, drivers in a particular driver group come to a complete stop at stop signs (which may be defined and a detected reduction of speed below 2 mph in the vicinity of a stop sign) for approximately 90% of the stop signs that they encounter. The same group of drivers may come to a "rolling stop" (in which they slow, but do not come to a "complete stop") for 7% of the stop signs that they encounter. At the remaining 3% of the stop signs that these drivers encounter the driver's behavior may be classified as "no stop," because the driver failed to decelerate to a speed that would qualify for a given rolling stop definition.

An intelligent driver monitoring system (IDMS) may detect a variety of driving behaviors in the vicinity of a stop sign. A detection of a "no stop" may be a basis for a severe alert, such that the IDMS device is caused to upload a video recording of the event to a remote server. The uploaded video may thereafter be reviewed by a safety manager or shared with the driver via a smartphone app, and the like, in the context of a driver safety program. A "rolling stop" event may be a basis for a moderate alert, such that the IDMS device may be caused to upload a video recording of the event, although the device may be configured such that the likelihood of uploading video associated with moderate events is lower than it is for severe events. Lastly, a "full stop" event may be a basis for a positive alert. Considering that video data of compliant stop sign behavior has relatively little instructive value for a driver who is already driving safely, a video upload threshold for positive alerts, such as "full stop" events, may be low or even set to zero. In all cases, even when a video of the event is not uploaded, an IDMS enabled with certain aspects of the present disclosure may be configured to upload an indication of the event along with an indication of the geolocation of the event (such as with GPS coordinates) to a remote server. In the proceeding paragraphs "no stop" and "rolling stop" events may be considered combined into a single class of stop sign violations, such as a class of "non-compliant" driving behavior in a stop sign scenario.

Indications of the stop sign events, including "no stop" or "rolling stop" violations and "full stop" events may be received by a computing process having access to messages from a number of similarly enabled IDMS devices. In one example, the computing process may operate on a cloud server that may be configured to receive messages from IDMS devices that, in turn, are individually mounted in different vehicles.

Stop sign violation and full-stop data may be collected and used to compute a stop sign compliance metric. A compliance metric may be a number of stop sign violations observed in a given time interval divided by the number of stop sign encountered in the same time interval, which may be expressed as: (number of stop sign violations)/((number of stop sign violations)+(number of full stops)). Stop sign compliance may be calculated for a given vehicle, for a driver, or for a driver group. In some embodiments, it may be advantageous to compute a compliance metric over a group of drivers who tend to drive in the same city, country, or region. In some embodiments, it may be advantageous to compute a compliance metric over a group of drivers who drive the same type of vehicle, such as a public city bus. In some embodiments, it may be advantageous to compute a compliance metric over a group of drivers who are associated through employment, and therefore may have access to the same or comparable driver training resources and support.

In some embodiments, IDMS devices may be assigned to a vehicle in a "fleet." A fleet may refer to a group of vehicles, drivers, support staff, and the like, that coordinate their activities. For example, a fleet dispatcher may coordinate the activities of several drivers and vehicles belonging to the same fleet. Some fleets may be further organized into regional groups. For example, a first regional group may operate primarily out of a warehouse in Detroit, Michigan, while a second regional group of the same fleet may operate primarily out of a warehouse in Denver, Colorado. The fleet may be a loosely or highly coordinated collection of regional groups. In some cases, the different regional groups of a fleet may be engaged in similar activities (e.g., pizza delivery) but in different regions.

When drivers in a first regional group are engaged in similar activities as drivers in a second regional group (which may be inferred, for example, by their membership in the same fleet), the drivers in either group may be expected to encounter a similar mix of driving risk scenarios in their daily trips. For example, pizza delivery drivers in different cities may each be expected to spend their time primarily in residential neighborhoods and may be expected to make several short duration and short distance trips, often with multiple stops. Accordingly, drivers in each city would be expected to encounter stop signs at similar rates.

Continuing with the present example, the pizza delivery fleet may calculate a bonus for the regional group that exhibits the safest driving. The fleet may use a measure of safest driving that depends, at least in part, on a stop sign compliance metric. The fleet may then award the fleet having the best compliance scores (lowest ratio of stop sign violation to encountered stop signs) with a bonus, recognition, and the like.

Conversely, an aim of a cross-fleet safety program might be to identify which regional groups exhibit the riskiest driving behavior, as these groups could then be targeted for additional coaching resources, additional resources to hire new drivers if it is determined that the current roster of drivers have schedules that are too demanding, and the like.

While the benefits of accurate evaluation of the safety of drivers in different groups may be clear, the practical implementation of such a program may be confronted with certain obstacles that are rooted in certain regional variations, as will be illustrated with examples below.

Certain aspects of the present disclosure are aimed at solving problems that may become pronounced when a fleet is composed on multiple regional groups, and the fleet desires a consistent and fair way to assess safety issues associated with each regional group. Regional variations, such as variations in local protocols for placing road signage, may cause imbalances in the way that IDMS errors are distributed geographically, which in turn effects the fleet's ability to run its safety program accurately and fairly. Some regional groups may be active where there are variations that cause high numbers of false positives by a driver monitoring system, whereas regional groups may be unaffected by local variations and may consequently experience a relatively low rate of false positive detections of non-compliant driving behavior.

As an example, a fleet may discover that a regional group having a below-average safety score is in fact one of the safer regional groups, but that the group operates in a city that has consistently chosen to place traffic signage in city intersections in a manner that causes IDMS device logic to fail. Because the fleet continues to operate in the geographical area having the unusual traffic signage, the fleet may cause the IDMS logic to fail frequently, and consequently a geographically rare "error-mode" for the IDMS results in a consistent under-evaluation of the groups' safety.

Unfortunately, poor-performing groups will also consistently trigger an above-average number of safety violations. Thus, a challenge becomes separating poor-performing groups from average or high-performing groups that happen to be encounter IDMS error modes more frequently due to geographic variations. Certain aspects of the present disclosure are aimed at addressing this type of problem.

According to certain aspects, a cloud server may be configured to query a database. The database may include rows comprising an event code (e.g., stop sign violation or 'full stop'), timestamp, group id, device id, and latlong (GPS position). The latlong may refer to the GPS coordinates of the camera that detected a stop sign at the time that a stop sign crossing was detected and classified on the device. From multiple rows, the cloud process may determine compliance rate per location. In some embodiments, the cloud server may be further configured to query a database having rows comprising device id and total minutes of driving observed, total miles observed, and the like. These fields may be used to calculate alternative metrics that may be similar to stop sign compliance, but which may be based on time or mileage rather than the number of stop signs encountered.

It will be understood that the technique just described, and as will be subsequently elaborated, could also be applied to other driving behaviors that may be detected by a driving behavior monitoring system, such as an IDMS. Such behaviors include speeding compliance (percentage of time speeding)/(driving time); traffic light compliance (traffic light violations)/(traffic lights encountered). For clarity, however, the following illustrations focus on driving behaviors associated with a stop sign scenario.

In an embodiment of certain aspects of the present disclosure, a method may be defined as over a time range spanning from date_start to date_end. These time ranges may then be used to query for previously observed event data in a database containing driving data observations, including event codes corresponding to different stop sign scenario driving behaviors including full stop, rolling stop, and no stop. As described above, the driving data observations may be stored in a centralized server or the query may be distributed to multiple edge computing devices. In addition to querying the database of driving data observations for detected stop sign scenario driving behaviors, a query may be formed to receive driving minutes data for the time range. The driving minutes data may refer to the amount of time spent driving for each of the drivers in a driver group. The sum of each driver's count of non-compliant alerts (no stop and rolling stop) for the group may be divided by the sum of each driver's driving minutes to yield a rate of non-compliant behavior observations per minute. This value may be multiplied by 60 to yield an hourly alert rate, where alert rate refers to the rate of non-compliant behavioral observations that were detected, even if erroneously, by a driving behavior monitoring system over a period of time.

The driving minutes data may alternatively be queried so that the driving minutes of all drivers in the driver group are aggregated. Aggregated driving behavior counts and driving minutes data may protect privacy of individual drivers in the driver group and at the same time provide event counts that that are closer to a group average than would be expected of observations from a single driver. The aggregated number of non-compliant alerts (no stop and rolling stop) for the group may be divided by the aggregated number of driving minutes to yield a rate of non-compliant driving behavior observations that may be equivalent to the rate of non-compliant driving behavior observations computed from individualized records of driving behavior.

Figure 2:
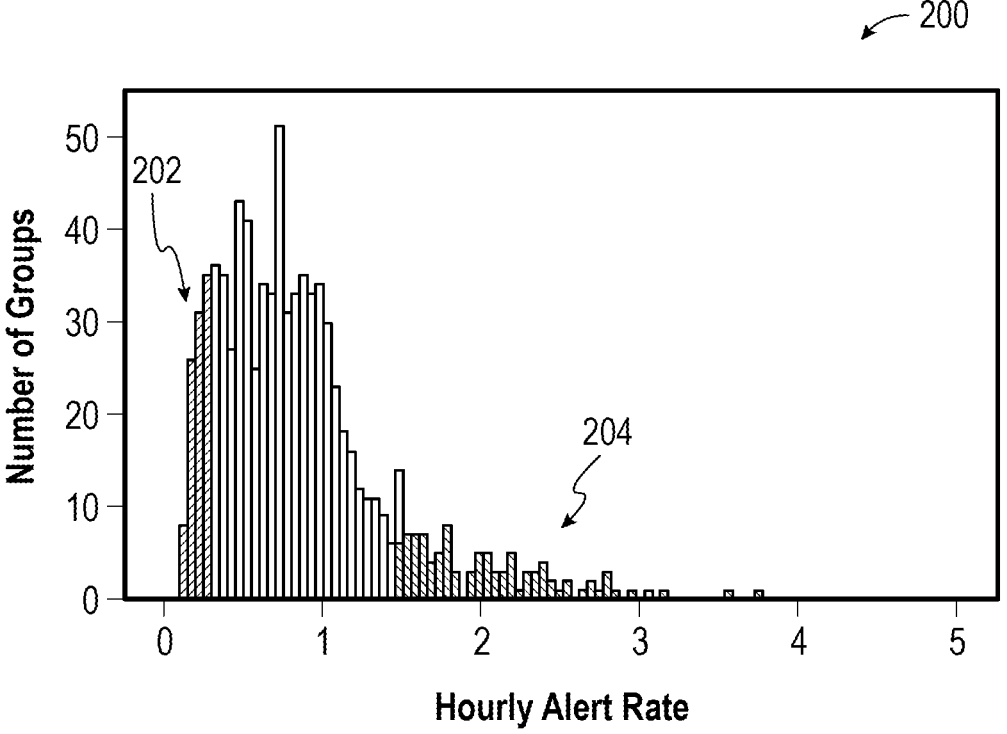
FIG. 2 illustrates an example of a distribution of Hourly Alert Rates for different geographic groups consisting of groups of drivers in accordance with certain aspects of the present disclosure.

A histogram of Hourly Alert Rate measurements is illustrated in FIG. 2 for approximately 800 regional groups in a loosely coordinated fleet. All of the regional groups are occupied in similar driving activities, but each regional group is active in a substantially non-overlapping region of the United States. One regional group may concentrate its driving activity on one small town, whereas four regional groups may driver in different quadrants of a small city. The regional groups may be considered together. As illustrated in FIG. 2, a first cluster 202 includes the 100 regional groups having the lowest hourly alert rate. Because a low hourly alert rate corresponds to a high compliance rate, the first cluster 202 may be considered a cluster of driver groups having a high compliance score. A high compliance score may be a complement of the alert rate, or it may refer to the ordinal position of a driver group in a ranked list of driver groups, a histogram of which is illustrated in FIG. 2. All of the regional driver groups in the first cluster exhibit an hourly alert rate of less than 0.25, meaning that on average, drivers in groups in the first cluster 202 elicit a non-compliant driving behavior observation from an automated driving behavior monitoring system about once every four hours.

A second cluster 204 includes the 100 regional groups having the highest hourly alert rate. The regional driver groups in the second cluster 204 exhibit an hourly alert rate of 1.5 or greater, with a median near 2, meaning that on average, drivers in groups in the second cluster 204 elicit a non-compliant driving behavior observation from an automated driving behavior monitoring system about once every half hour, or about 8 times more frequently than the driver groups in the first cluster 202.

According to certain aspects, for each of the first cluster 202 of driver groups and the second cluster 204 of driver groups, a violation rate may be computed for each geographic location at which the targeted driving scenario was observed. In this example, each geographic location corresponds to a stop sign placed at an intersection. The violation rate for a geographic location may be considered a type of location non-compliance score. A location non-compliance score may also refer to a percentage of observed driving behaviors at a location that are non-compliant, which would be a measure that is normalized by the number of opportunities to exhibit a compliant driving behavior rather than the passage of time alone. To calculate such a location non-compliance score, a database of driving behavior observations may be queried for all observed driving behaviors (including compliant and non-compliant driving behaviors) for each of the regional groups in the cluster. For each detected driving behavior, a geohash may be assigned, such as an 8-character geohash corresponding to +/−19 m spatial resolution. The driving behaviors may then be grouped by assigned geohash. A sum of detected driving behavior counts of each driving behavior variation may be computed and stored as a denominator. The counts of no stop observations may be divided by this denominator to produce no stop location non-compliance component score. The counts of rolling stop observations may be divided by this denominator to produce rolling stop location non-compliance component score. Likewise, a rolling stop compliance. In some embodiments, the no stop location non-compliance score may be used as the non-compliance score for the location. In some embodiments, however, the rolling stop location non-compliance score may be added.

It may be advantageous to limit the location non-compliance score to no stop violations (or generally, to more severe versions of a non-compliant driving behavior), for example, if there is a desire to address types of errors associated with a misdetection of the driving scenario itself. For example, if the driving behavior monitoring system is confused by a picture of a stop sign in an advertisement in a bus stop waiting area shelter placed at an intersection that has no actual stop sign or traffic light, drivers may be observed to routinely drive past such an image of a stop sign without braking at all. Such a scenario is more likely to be revealed by focusing on locations where drivers tend to elicit a high number of observations of no stop non-compliant driving behaviors. A database of image data from such locations could be used to train a machine learning model to properly disregard objects that look like real traffic control devices but that humans easily understand are not (which can be inferred because the humans are observed to maintain constant speed when passing such traffic signs).

Other types of erroneous detections of non-compliant driving behaviors may be rooted in more subtle variations in layout (relative positioning) of where a stop sign is placed and where a driver is expected to stop. For more subtle errors rooted in these issues, it may be more common for a driving behavior monitoring system to determine that the driver performed a rolling stop, when in fact the driver came to a complete stop at a time either before or after an analysis window of the driving behavior monitoring system. In such cases, it may be advantageous to consider both severe (no stop) and moderate (rolling stop) variations of non-compliant driving behavior in a computation of a location non-compliance score.

Whereas errors relating to the detection of a driving scenario may result in exceptionally high location non-compliance scores for all driver groups, more subtle errors by a driving behavior monitoring system such as the example just provided may produce intermediate values for a location non-compliance score. For geographic locations associated with intermediate non-compliance scores, it may be advantageous to filter examples of detected non-compliance events so that it is more likely that false positive examples will be found. To this end, certain embodiments provide that the selection of image data may be based on both a location non-compliance score and a group compliance score. In this way, data may be selected from driver groups that have a high group compliance score. Because a high group compliance score indicates that drivers in a driver group tend to exhibit compliant driving behaviors in a given driving scenario, it is more likely that unusually high location non-compliance scores for these driver groups is actually the result of an unusually high rate of false positives. With respect to machine learning systems that perform event comprehension, a false positive may refer to an erroneous detection of a non-compliant driving behavior.

Figure 3:
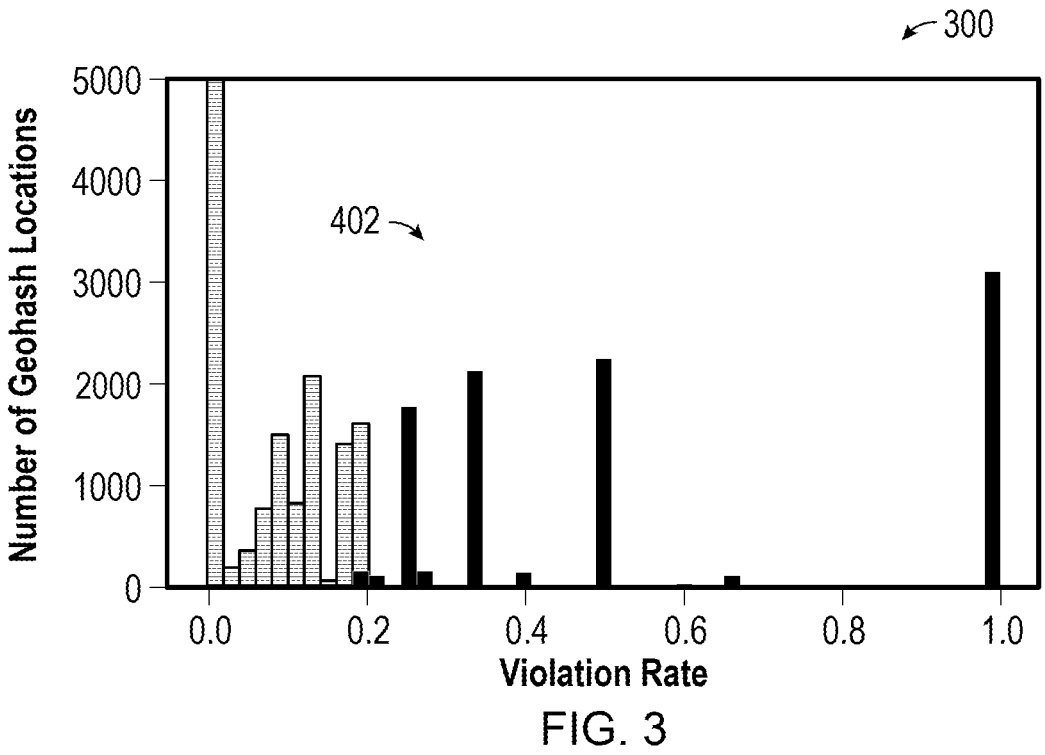
FIG. 3 illustrates an example of a distribution of Violation Rates for different geographic groups consisting of groups of drivers in accordance with certain aspects of the present disclosure.

The histogram 300 in FIG. 3 illustrates the number of geohash locations (geographic locations, each location expected to correspond to one stop sign) having a computed location non-compliance scores (here, a violation rate) for the first driver group cluster 202. The y-axis in FIG. 3 is cut-off to show a max value of 5000, but the first bin (corresponding to a violation rate of 0) has a value of approximately 400,000. This means that for the 100 driver groups in the first cluster 202 for the given time period of this analysis, there were approximately 400,000 stop sign locations at which only compliant driving behaviors (a full stop) were observed. In contrast, there were about 3000 stop sign locations for which only non-compliant driving behaviors were observed. There were also a little more than 2000 locations for which a non-compliant driving behavior was observed about as frequently as a compliant driving behavior. At least some of the locations in this middle group would be expected to correspond to subtle errors of the driving behavior monitoring system, given that fully compliant behavior is about 200 times as likely as equally compliant or non-compliant behavior is for this cluster of driver groups.

Figure 4:
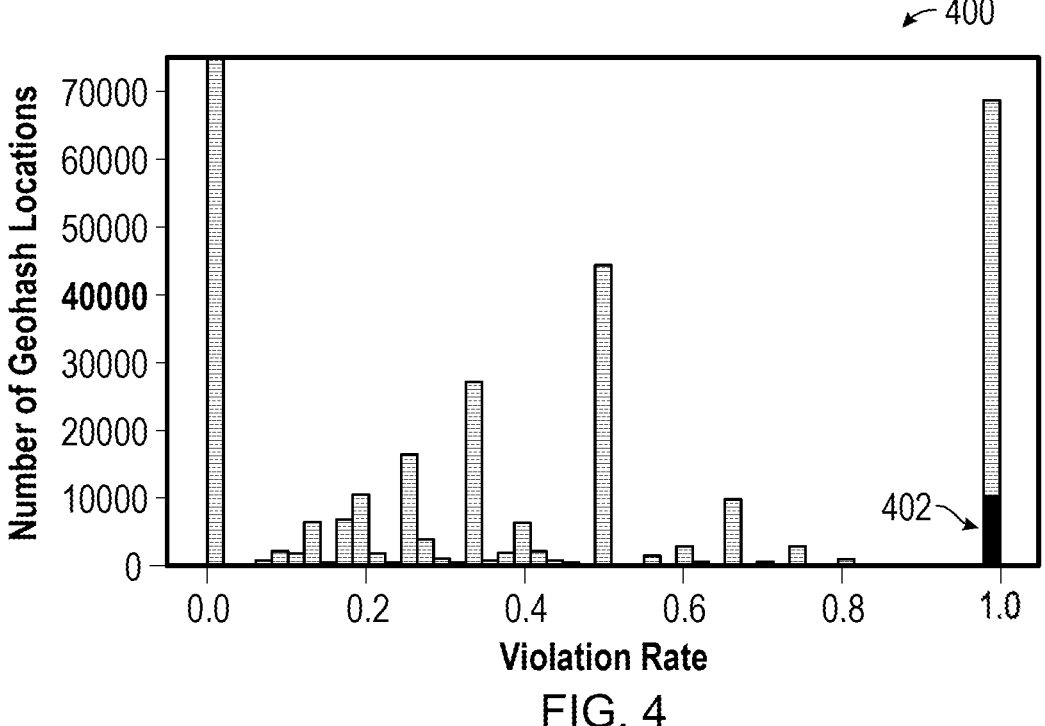
FIG. 4 illustrates an example of a distribution of Violation Rates for different geographic groups consisting of groups of drivers in accordance with certain aspects of the present disclosure.

The histogram 400 in FIG. 4 illustrates the number of geohash locations having a computed location non-compliance scores (here, a violation rate) for the second driver group cluster 204. The y-axis in FIG. 4 is cut-off to show a max value of 70000, but the first bin (corresponding to a violation rate of 0) has a value of approximately 300,000. This means that for the 100 driver groups in the second cluster 204 for the given time period of this analysis, there were approximately 300,000 stop sign locations at which only compliant driving behaviors (a full stop) were observed.

In comparison with the results from the first cluster illustrated in FIG. 3, the results from the second cluster illustrated in FIG. 4 show a much higher proportion of locations having a violation rate of 1 or 0.5. Whereas there were 3000 locations having a maximum location non-compliance score for the first cluster, there were over 20× that number for the second cluster.

To operationalize the above observations, for each of the two driver groups (driver group cluster 202 and driver group cluster 204) a fixed number of locations, such as 10,000 may be selected. This fixed number of locations may then be selected from a sorted list of location non-compliance scores. These 10,000 location selections are illustrated with the filled bars in the histogram 300 for the first cluster 202. For the first cluster, the 10,000 locations span violation rates of 0.2 to 1.0. In FIG. 4 these 10,000 location selections are illustrated with the filled bars in the histogram 400 for the second cluster 204. For the second cluster, the 10,000 locations all have the maximal violation rate. Accordingly, given a limitation on the number of training examples that may be added to a machine learning database (where the limitation may be based on data transmission bandwidth, labelling/auditing capacity and the like), filtering the selection of image data for inclusion into a machine learning database based on both a group compliance score (so that the driver groups in the first cluster 202 are selected) and the location non-compliance score may yield a diversity of potential types of false positives, including errors that are relatively subtle.

In some embodiments, rather than violation rates, a location non-compliance score may be based on a number (count) of non-compliant driving behavior observations. Similarly, the number of crossings, which may refer to the number of times that a traffic control device was encountered, may be used to further select among visited geographic locations. For example, it may be advantageous to limit selection of image data to locations for which at least a threshold number (for example, 5) driving events were observed. Filtering criteria may also relate to the number of unique drivers to have visited a location.

In some embodiments, after detecting the locations having a high location non-compliance score, requests for video data may be sent to devices in vehicles associated with the driver group that were known to have passed the identified geographic locations in the recent past. The duration of the recent past may be based on a known local storage capacity for video on the devices, so that video data associated with the geographic location is expected to still be available in a local memory of the device.

In accordance with the above disclosure, when an 8-character-geohash is used to geolocate each event from the start_latlong, it may be inferred that each geohash corresponds to at most one stop sign because the geohash accuracy is +/−19 m. This inference may be violated in some situations in which two stop signs are placed within 19 m of each other, provided that the two stop signs are also within the same region defined by the 8-character geohash.

Continuing with the present example, a driver group may be defined as the cluster of regional driver groups that are clustered together because they each have a low violation rate for stop sign scenarios. This metric may serve to indicate that these groups are comprised of drivers who generally abide by stop sign rules. After the geohash-violation rate is computed for these regional groups, a distribution of Violation Rates may be computed, as illustrated in FIG. 3. As may be observed with reference to FIG. 3, and as noted above, there are about 400 k geohash locations with 0% violation rate, or 100% compliance rate. There are about 3 k geohash locations with 100% violation rate. There are about 15 k other geohash locations with a violation rate >5%. While all of these locations could be associated with a high rate of false positive detections of non-compliance, due to transmission or labeling/review capacity it may be more practical to focus reviewing efforts instead on alerts at locations having higher violation rates. As described above, if the selection is limited to a fixed number, the locations that are reviewed might be those about a violation rate of 20%.

Further continuing with the present example, a second driver group cluster may be defined as regional driver groups that have a high alert rate for stop sign scenarios. This metric may serve to indicate that these groups are comprised of drivers who more frequently violate stop sign rules. After the geohash-violation rate is computed for these geographic groups, a distribution of Violation Rates may be computed, as illustrated in FIG. 4. As may be observed with reference to FIG. 4, there are about 300 k geohash locations with 0% violation rate, or 100% compliance rate. There are about 70 k geohash locations with 100% violation rate. This is a distinguishing attribute of this distribution compared to the distribution of the first cluster. Because there are so many locations with 100% violation rate among the high-alert rate drivers, which makes up a much higher percentage of all visited locations with respect to drivers in the first cluster, it may be inferred most of these locations are not sites of event comprehension failures, but rather they represent the stop sign locations that these drivers most frequently violate. Accordingly, a query for data relating to these locations is less likely to yield a large fraction of examples of false positive detections of non-compliant driving behaviors.

Application of Geohash-Violate Rate Analysis to Improve an IDMS

After reviewing the alerts selected above, there are a number of possible actions to take that may result in improvements of a system of driving behavior monitoring (or systems that rely thereon). In accordance with certain aspects, the candidate events may be identified based on selecting a number of anomalous geohash-violation locations. By filtering the set of observed stop signs to identify the ones most likely to be anomalous based on the above-mentioned crowd-sourced driving behavior technique, it may be possible to segregate alerts into one of at least four categories: first, stop sign locations that tend to trigger an event comprehension failure. Second, stop sign locations that for which non-compliance may be unusually high, but which may be safely ignored during the operation of a driving monitoring system. Third, stop sign locations that for which non-compliance may be unusually high, and which should be emphasized during the operation of a driving monitoring system. Fourth, false positive stop signs, which may indicate a problem rooted in an underlying perceptual engine of the IDMS.

Figure 5:
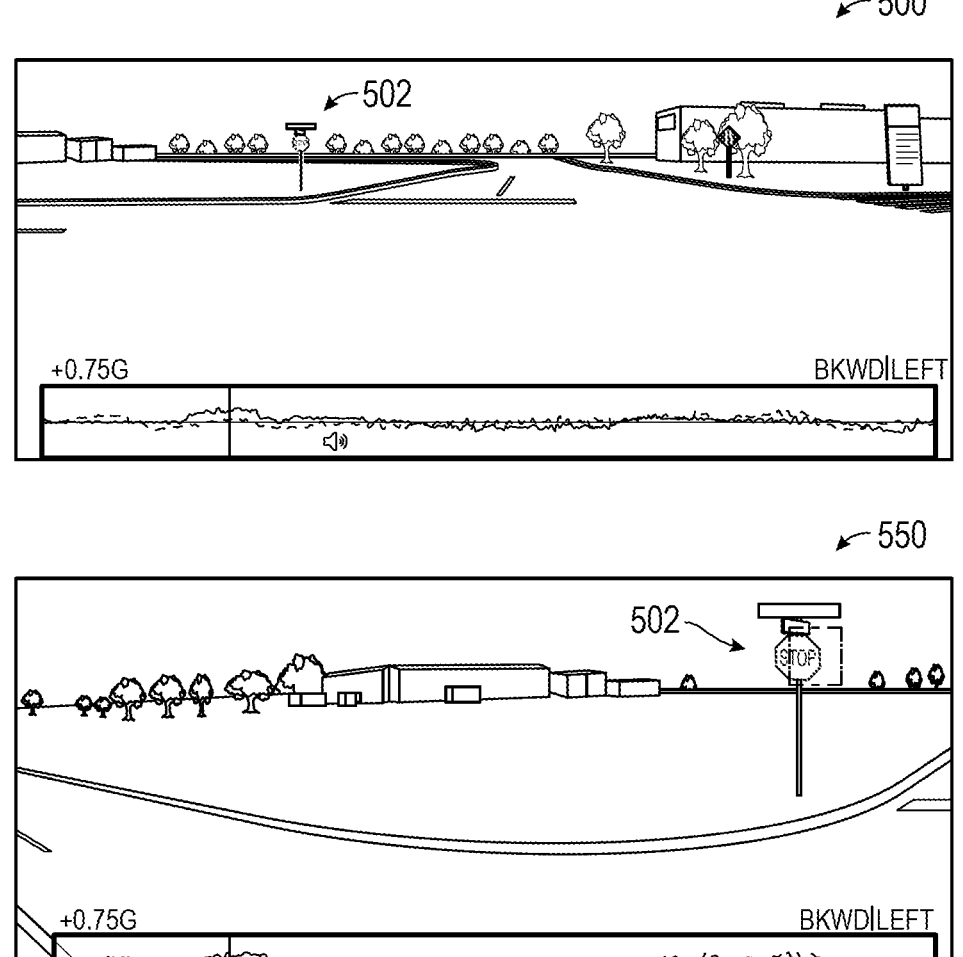
FIG. 5 illustrates an example of event comprehension failure as may be identified in accordance with certain aspects of the present disclosure.

FIG. 5 illustrates an example of a detected event comprehension failure. Here, stop signs are placed at near and far sides of an intersection, which is atypical across the United States, but which may be observed frequently in certain cities and counties. In this example, the driver came to a complete stop before the intersection, a time when data collected by a camera in the vehicle is depicted as 500. The vehicle then drove through the intersection, turning left. The stop sign 502 on the far side of the intersection was detected by a neural network model running on an edge device in the first image data 500 and in the second image data 550, but event comprehension logic did not properly associate the stop sign 502 with the location where the driver came to a complete stop. Accordingly, the system generated an audible alert soon after the driver's vehicle crossed by the stop sign 502. This is an example of the type of event comprehension failure that might occur with an intermediate frequency, as described above. Accordingly, anomalous road sign scenes like this one may be difficult to data mine when considering driving events captured by driver groups that have high baseline non-compliance rates.

Figure 6:
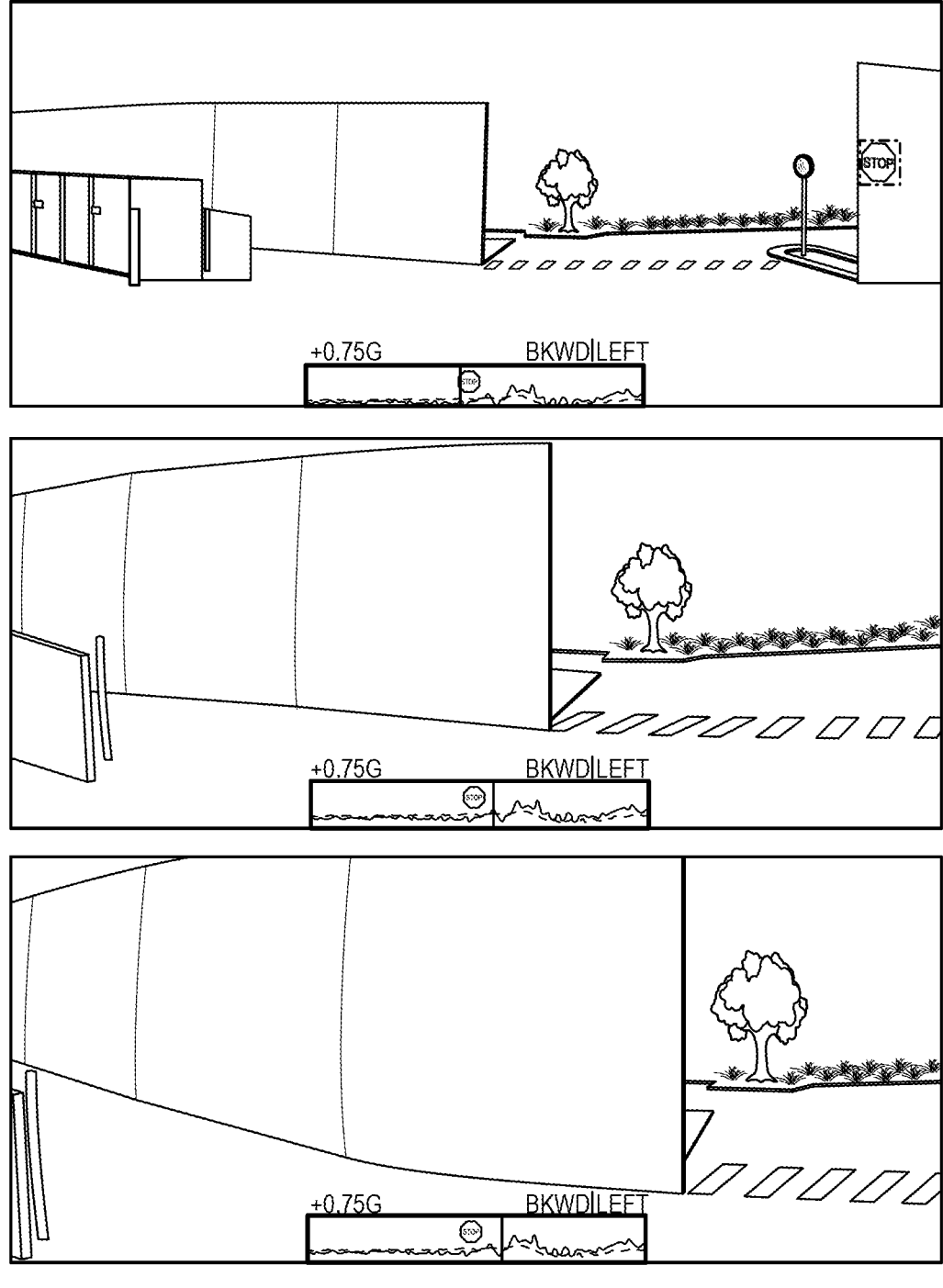
FIG. 6 illustrates an example of event comprehension failure as may be identified in accordance with certain aspects of the present disclosure.

FIG. 6 illustrates a different example of a detected event comprehension failure. Here, a stop sign is located near the exit of a parking lot. However, a driver may turn left just prior to exiting the parking lot. In certain IDMS configurations, a stop sign violation may be triggered in this case, as if the driver had turned left at an intersection controlled by the stop sign. Here, the machine learning system may interpret the event as it would if the driver had approached an intersection controlled by a stop sign and then proceeded through the intersection, turning left, but not stopping. The difference here is that additional contextual cues, especially the interior of a wall and a crosswalk on the far side of the wall would indicate to a human driver that the stop sign only applies to drivers who exit the area that is enclosed by the wall. That is, in this situation, a driver is only required to come to a complete stop if the driver next travels past the crosswalk. Here, instead, the driver turned left before the crosswalk and onto a ramp. Therefore, the driver was not supposed to come to a complete stop.

According to certain aspects described above, a location non-compliance rate may be expected to depend heavily on whether drivers who approach this stop sign tend to turn left and up the ramp or whether they tend to exit the area. The non-compliance rate would be comprised the events in which the driver exited the area and did not stop as well as any events in which the driver turned left up the ramp without stopping. Because the latter events are not actually non-compliant driving behaviors, the location non-compliance score may be inflated until the machine learning system can be trained and/or reconfigured to properly disregard events in which the driver approached the stop sign but did not cross the threshold indicated by the crosswalk.

Figure 7:
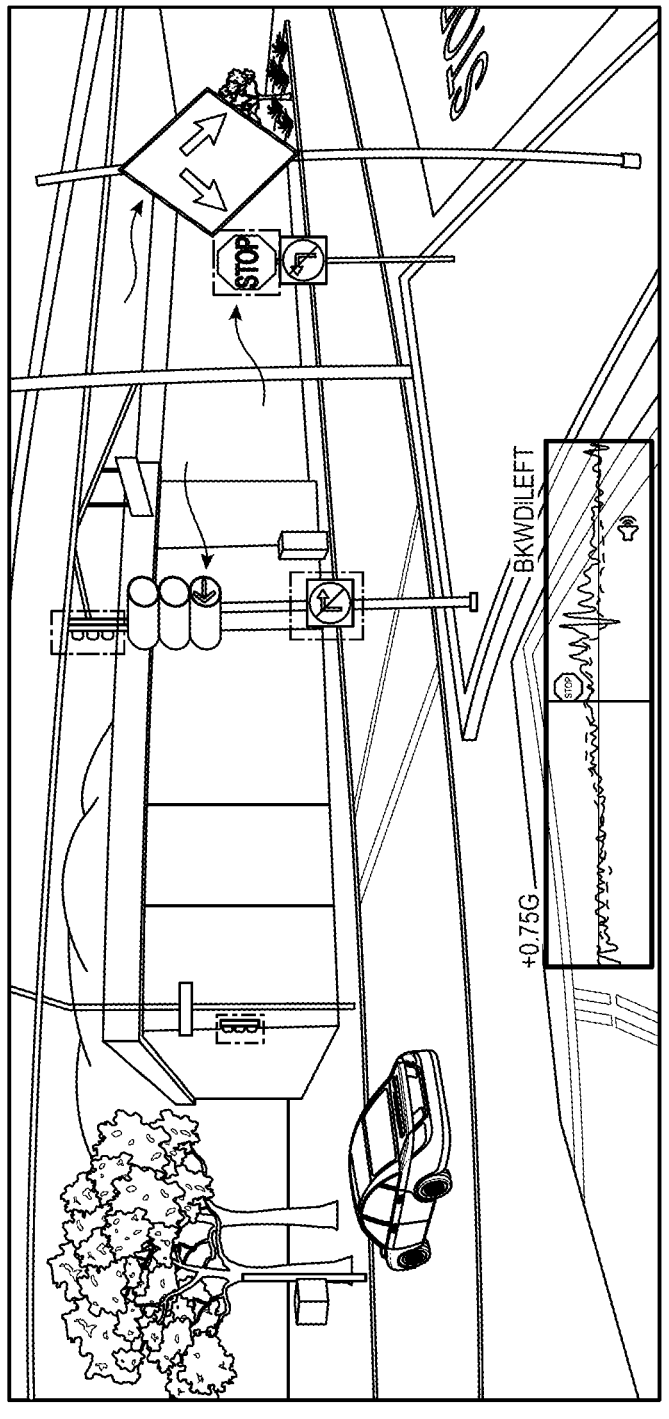
FIG. 7 illustrates an example of event comprehension failure as may be identified in accordance with certain aspects of the present disclosure.

FIG. 7 illustrates another example of a detected event comprehension failure. Here, there are effectively two sets of traffic control systems controlling the same intersection, but each covering one of the possible turns. A left turn in this case is governed by a traffic light. A right turn, however, is governed by a stop sign. As illustrated, when a driver turns left at this intersection, an IDMS may mistakenly trigger a no-stop stop sign alert due to the proximity of the stop sign relative to the vehicle. This type of event comprehension logic is similar to that illustrated in FIG. 6 in the sense that the stop sign that is detected only applies to a driver if the driver crosses through the intersection in a particular direction. In FIG. 6, the stop sign would only apply if the driver crossed straight through a passage between walls. In FIG. 7, the stop sign would only apply if the driver turned right at the intersection. Another type of unusual stop sign applies to drivers unless they turn right at an intersection.

Figure 8:
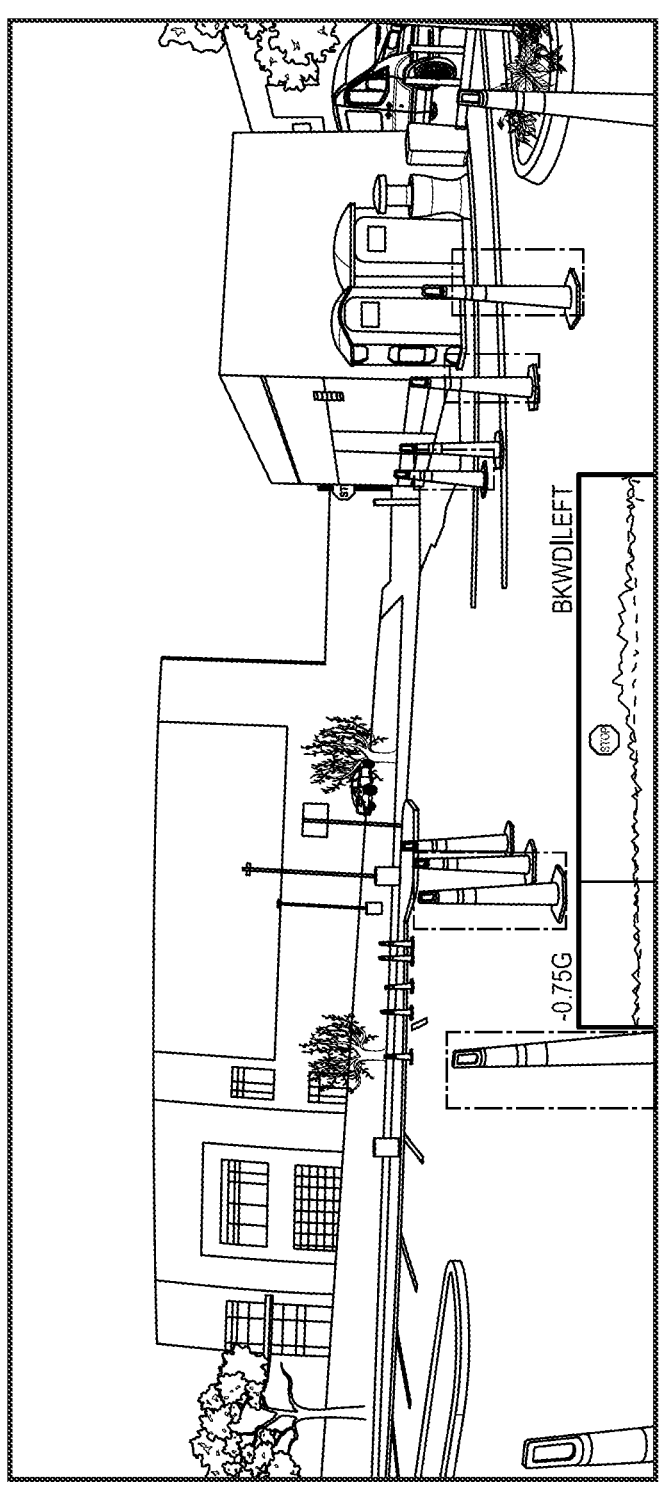
FIG. 8 illustrates an example of a stop sign context for which non-compliance may be unusually high as may be identified in accordance with certain aspects of the present disclosure.

FIG. 8 illustrates an example in which certain aspects of the present disclosure may serve to identify a stop sign for which non-compliance may be expected. Here, traffic in a warehouse area is highly-controlled through the use of temporary construction cones. These cones in this instance indicate that standard traffic sign rules may not be in effect. This is an example in which the logic of a driving monitoring system may have properly interpreted that a stop sign is placed in such a way that it is intended to apply to the driver. However, in this example, that traffic control logic is overridden by a superseding set of traffic control devices. In this case, the superseding (or overriding) context is provided by the temporary construction cones.

Figure 9:
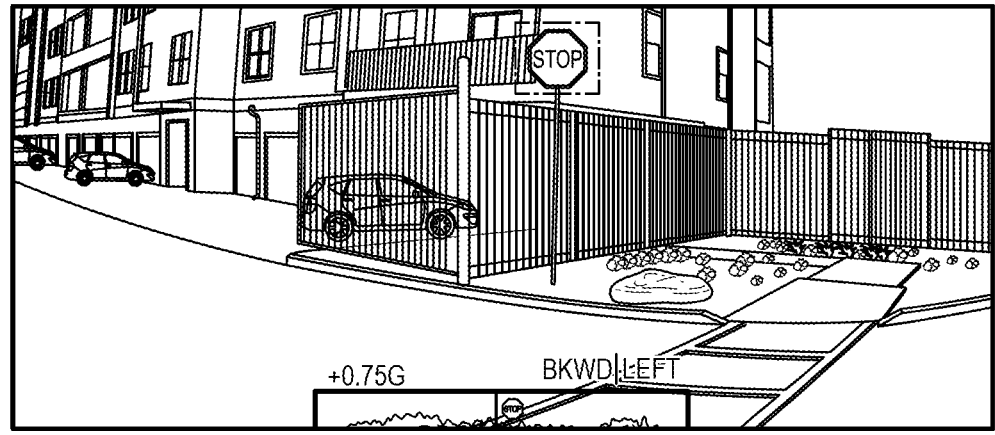
FIG. 9 illustrates an example of a stop sign context for which non-compliance may be unusually high as may be identified in accordance with certain aspects of the present disclosure.
Figure 9:
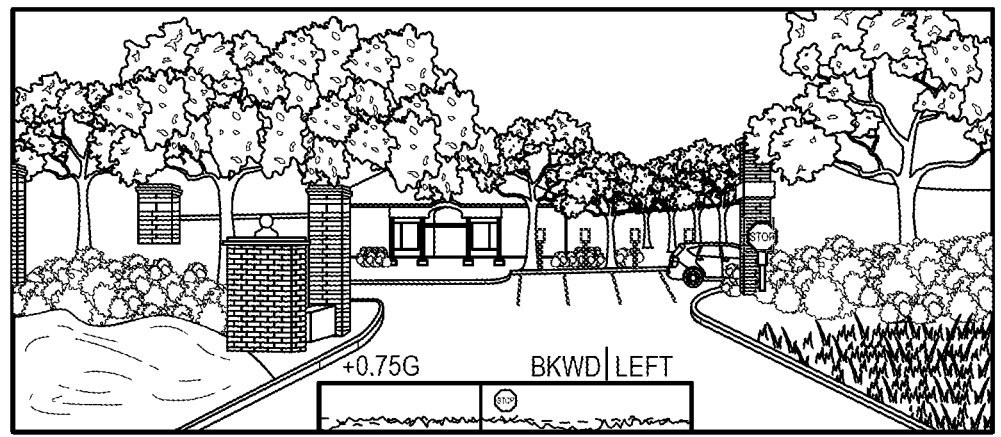

In FIG. 9, the top panel illustrates an example of a stop sign scenario for which non-compliance may be intentional. Here, a private residential roadway may be treated as conditional on the presence of a pedestrian or cross-traffic, such that when neither are present, the driver is not expected to make a complete stop at the stop sign. The bottom panel in FIG. 9 depicts a different residential roadway scenario at which non-compliance may be common, although maybe not intentional. In this case, the stop sign is smaller than typical stop signs on public roads. In addition, the stop sign might be partially obstructed by shrubs. The bottom panel depicts a scene that a safety manager might want to flag a deserving additional attention by drivers. Accordingly, a driver safety system may rely on accurate scene comprehension in this scene.

Figure 10:
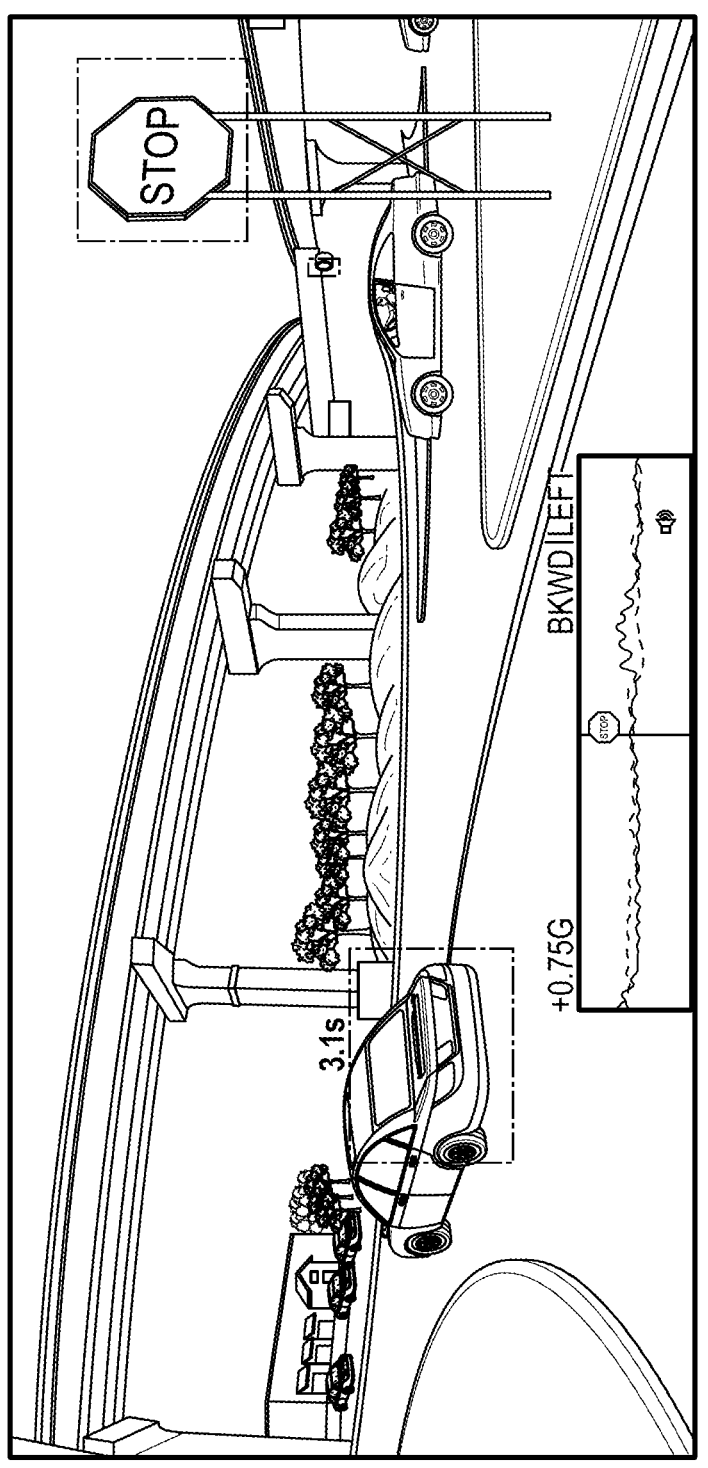
FIG. 10 illustrates an example of a stop sign context for which non-compliance may be unusually high as may be identified in accordance with certain aspects of the present disclosure.

FIG. 10 illustrates another example of a stop sign for which non-compliance may be common. Here, the context of the stop sign seems to indicate that drivers should treat the stop sign as they would a yield sign. This interpretation is supported by observed driving behavior in the vicinity of the stop sign, both by vehicles having IDMS devices and by vehicles that can be observed from such vehicles. This interpretation is further supported by the temporary appearance of the poles on which the stop sign is placed. According to certain aspects, upon discovering a location, such as the scene depicted in FIG. 10, for which the placement of a stop sign appears to be a poor choice of a traffic control planning body, a message may be communicated to local transit authorities so that they may review the circumstances surrounding the abnormally high rate of stop sign violations at this location.

According to certain aspects, certain categories of identified anomalous road signs may be used to improve the functioning of an IDMS. Improvements may be made in stages. Examples of the type "event comprehension failure" or "non-compliance" may be expected could (a) ignored/geofenced, (b) handled on a case-by-case basis, or (c) collected with similar examples to support a new type of full-frame class detection, so that anywhere the IDMS operates appropriate rules could be applied when a similar scene is recognized based on the result of the full-frame class detection.

Figure 11:
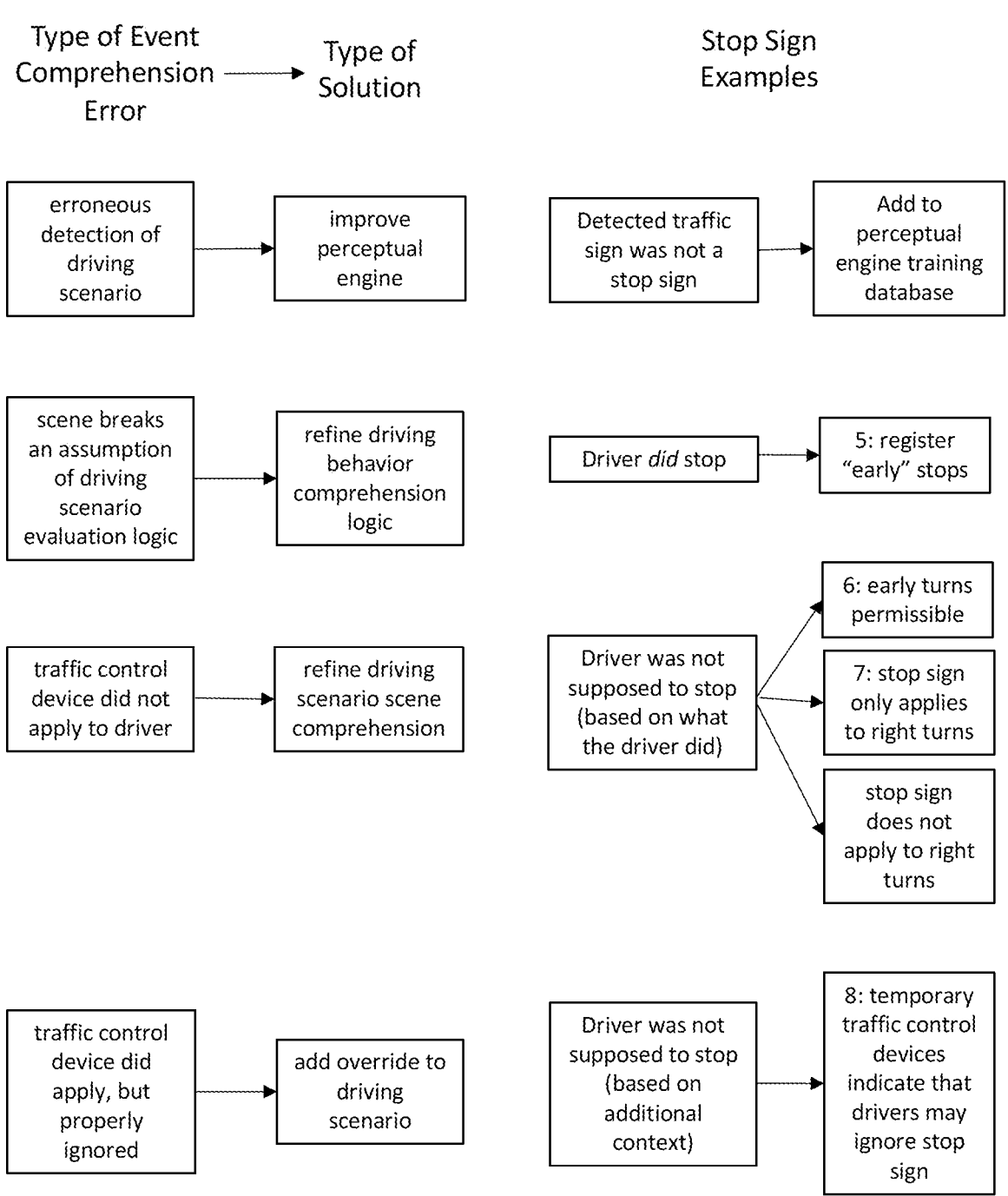
FIG. 11 illustrates block diagrams of different types of event comprehension failures together with the form of a solution to address each, in accordance with certain aspects of the present disclosure.

FIG. 11 illustrates a block diagram of different types of Event Comprehension Failures together with the form of a solution to address each. On the right of FIG. 11 are corresponding concrete example concerning a stop sign scenario.

Figure 12:
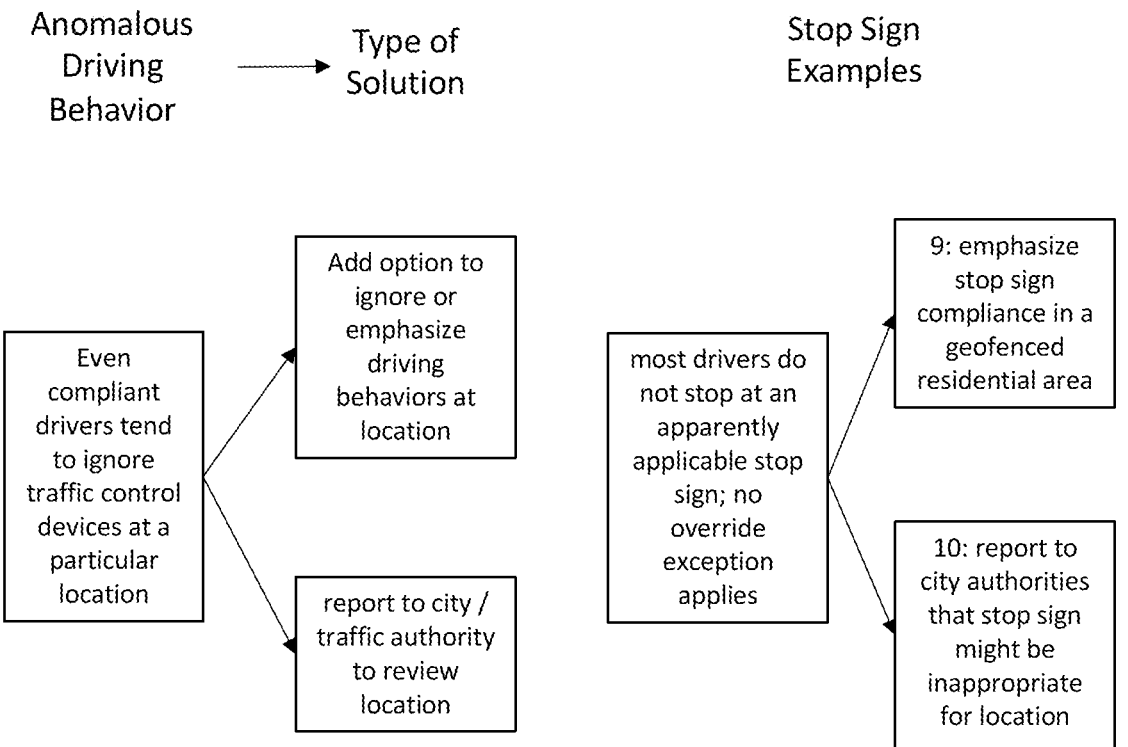
FIG. 12 illustrates block diagrams of different types of anomalous driving behavior together with the form of a response to address each, in accordance with certain aspects of the present disclosure.

FIG. 12 illustrates a block diagram of different types of Anomalous driving behavior together with the form of a response to address each. On the right of FIG. 12 are corresponding concrete example concerning a stop sign scenario.

Figure 13:
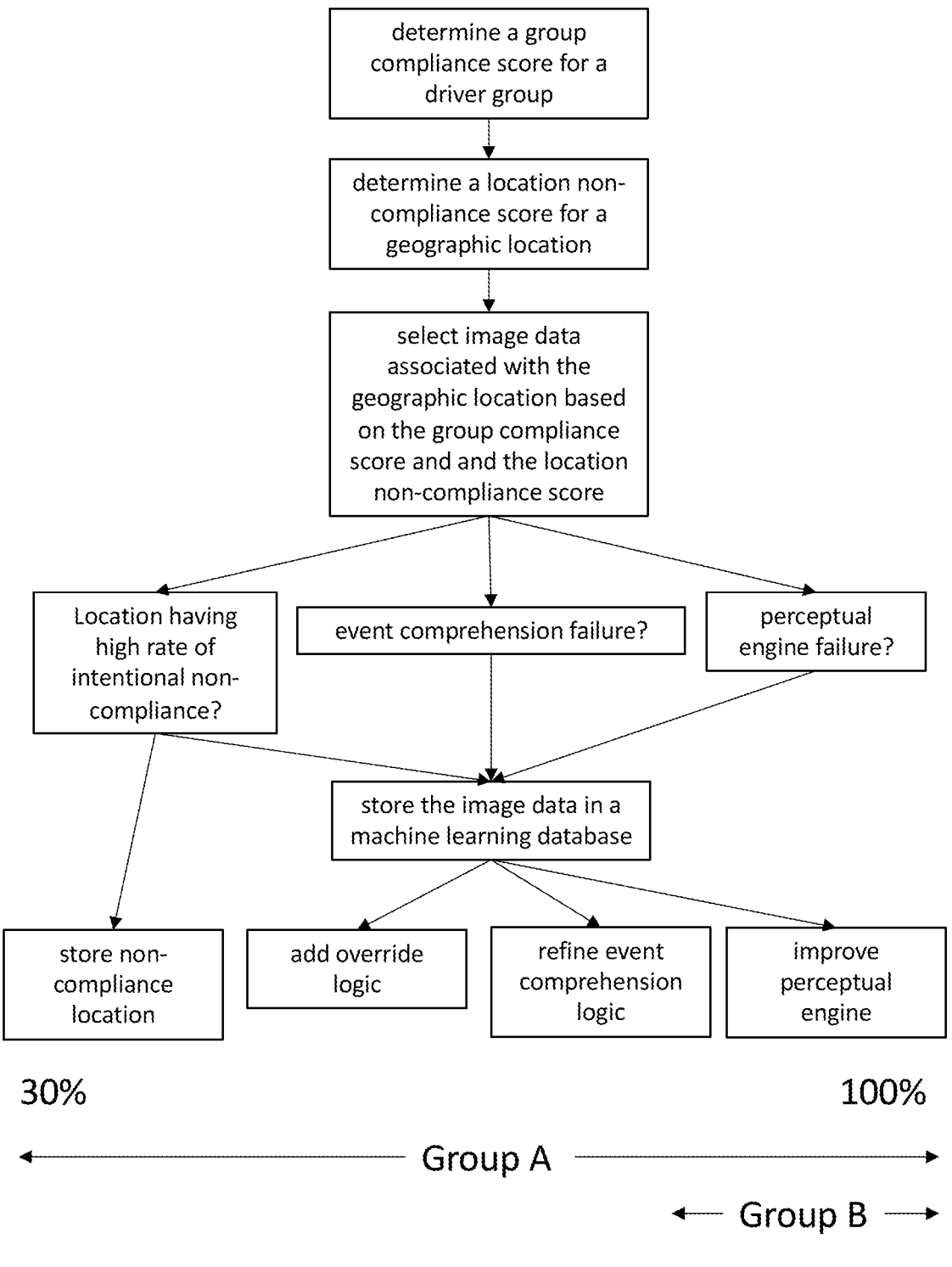
FIG. 13 illustrates the logical flow of certain embodiments of the present disclosure.

FIG. 13 illustrates the logical flow of certain embodiments of the present disclosure. At the bottom of FIG. 13 there are percentages. These refer to a rough estimate of the violation rates associated with different types of errors. The large span of Group A indicates that event data from Group A (a driver group with a high group compliance score) may be mined within the bounds of bandwidth and other resource constraints, to augment a machine learning database with examples of each of these types of error modes. In contrast, the relatively small span of Group B (a driver group with a low group compliance score) indicates that event data from Group B may only be useful for cases in which the non-compliance rates are so severe as to suggest a failure by a perceptual engine, such as a neural network capable (albeit with a nonzero error rate) of detecting and classifying traffic signs.

In reference to the flow diagram illustrated in FIG. 13, certain steps may be considered optional. For example, the three blocks having a question mark may refer to a result of reprocessing of event data (which may be image data and associated sensor and/or inference data associated with a traffic event). Alternatively, or in addition, the three blocks may refer to the result of human review of event data. When event data is either reprocessed or reviewed by one or more human reviewers, a machine-readable label may be generated. For example, the label may correspond to an indication that the event data is an example of a "true positive," meaning that a detected non-compliance event reflected an accurate comprehension of the event by the automated system. In another example, the label may correspond to an indication that the event data is an example of a "false positive," meaning that a detected non-compliance event reflected was an erroneous comprehension of the event by the automated system. In some embodiments, whether the event is a true positive or a false positive may be represented by a binary indicator. For example, a "1" may indicate a "true positive" label and a "0" may indicate a "false positive" label. In some embodiments, a more detailed labeling nomenclature may be employed. In another example, the label may correspond to an indication that there was a perceptual engine failure at an early stage of the event comprehension pipeline. FIG. 11 depicts examples of various types of errors that may be observed, both for traffic events in general and specifically in relation to stop sign scenarios.

In some embodiments, image data may be stored in a machine learning database prior to an association with labels. In these embodiments, the step of labeling an event based on human review or other reprocessing may be skipped. Such event data may then be used in an unsupervised learning framework wherein exposure to a greater number of challenging scenarios is expected to result in an improved internal representation of such scenarios, and ultimately to improvements to event comprehension precision. Alternatively, such event data may be used in a hybrid supervised/unsupervised learning approach wherein examples that are included according to the "select image data" step are used for training in a statistical manner. For example, a machine learning model may be trained with an error function that induces the machine learning model to classify a target percentage of events as erroneous but without indicating which event examples should be so classified.

In some embodiments, the image data that is selected for inclusion into a machine learning database is captured by a camera in a vehicle of a driver in a driver group having a high group compliance score. In some embodiments, the image data may be collected from vehicles and/or drivers who are not associated with the driver group. In one example, certain traffic control devices are only applicable to certain types of vehicles. A traffic sign may be placed near a road or a lane in a road to indicate that a traffic control device applies to most vehicles but not all. For example, vehicle traffic may be required to stop prior to an entry merge zone of a highway, unless the vehicle is carrying two or more people and thus qualifies as a carpool. In such cases, vehicles in a fleet that is in the business of transporting passengers may fail to "comply" with this sign in the sense that event comprehension logic may erroneously trigger a non-compliance detection when a carpool vehicle fails to stop at the traffic control device. If so, the location non-compliance score may be high. In this example, it may be beneficial to collect event data from in-group as well as out-group vehicles. In-group vehicles may approach the location, for example, from a carpool lane, whereas out-group vehicles may not. These differing perspectives of recorded camera data may enable a machine learning model to properly perform event comprehension based on the lane of approach. In this example, image data from an inward-facing cameras may be beneficial, as it may provide evidence that vehicles that approach the location from the carpool lane tend to have at least one passenger in the vehicle, while vehicles that approach the location from lanes that are required to stop tend to be occupied by a driver driving alone.

In some embodiments, event data may be selected based primarily from example of events that were initially characterized by an edge computing device as non-compliant. However, as in the case of the example just described, it may be beneficial to additionally select examples of behaviors that were detected as compliant from the same locations. A balanced dataset containing both true and false positives may enable higher precision of an event comprehension system. Still, when employed to improve an event comprehension system that is already performing at a high precision rate, it may be preferable to select a greater number of false positives in the training set, because it may be assumed that other techniques for including data in the database, such as a random audit procedure is likely to include greater numbers of true positives. Thus, certain aspects of the present disclosure may be considered as a means of achieving a desirable balance between true positive and false positive events in a machine learning database.

In some embodiments, the machine learning database may be comprised of multiple databases. For example, the machine learning database may include sequential image data, which may be referred to as video data together with an indication that the sequential image data corresponds to a compliant or non-compliant driving behavior. In addition, the machine learning database may include single frame image data of a scene together with an indication that a traffic control device is present in the scene. Furthermore, a machine learning database may include crops of single frame image data, where the crops include a portion of an image corresponding to a detected traffic control device. Such a database may be used to train a perceptual engine to classify traffic control devices. Event comprehension failures that are rooted in a misclassification of a traffic control sign may be stored in an image crop data base as a crop surrounding the traffic sign itself. It may also be stored in a single frame database to improve driving scenario detection. It may also be stored in as video data so that an event comprehension module may be trained to make repeated characterizations of the sign that was erroneously classified in a real-world deployment.

Examples of erroneous driving scenario detection may be well suited to unsupervised training methods. When an event comprehension system fails to accurately classify a traffic sign, it may be understood that the event comprehension system classified the traffic sign erroneously multiple times (corresponding to processing of multiple frames captured over the course of an event). During some events it may have classified the traffic sign correctly while processing some image frames, but it happened to classify the traffic sign incorrectly in a larger number of frames. Upon training a perceptual engine on some examples, the same perceptual engine may be incorporated to the event comprehension system, such that the result of the entire system changes. This may be done even though there was no human review of the event in question. This illustrates one reason why it may be advantageous to store image data into a machine learning database even when the image data is stored without a label from a human review. In this example, the event data may be considered labeled by an indication that the event comprehension classification has changed relative to result of a less-trained event comprehension system.

In some embodiments, an end result of certain aspects of the present disclosure may be a refinement in driving behavior comprehension logic. Logic improvements may be achieved automatically in the case of sequential learning architectures, or may be incorporated into thresholds or other logical operations that interface with the results of a machine learning system. The situation illustrated in FIG. 5, for example, may result in an event comprehension logic whereby the system learns to register early stops at a detected stop sign. In particular, the system may learn that the stop sign placed at the far side of an intersection nevertheless directs a vehicle to come to a complete stop before it enters the intersection.

Contrasted with the situation depicted in FIG. 5, the scene illustrated in FIG. 6 cautions that event comprehension logic must also appreciate that in certain scenes a detected stop sign only applies if drivers come very close to a stop sign. A driver who approaches the stop sign in FIG. 6 but turns just before reaching it is not expected to come to a complete stop. Handling of such a scenario may be considered a refinement of driving scenario scene comprehension.

As summarized in FIG. 11, there are multiple ways that driving scenario scene comprehension may be refined. FIG. 6 illustrates an example where early turns (without stopping) are permissible. FIG. 7 illustrates an example where a stop sign only applies to right turns at an intersection. There are other examples, not shown, where a stop sign does not apply to right turns but it does apply to other directions of travel. For all of these examples, image data may be stored as video data together with an indication of an explicit label (or in an unsupervised regime, together with an indication that the scene was initially classified as non-compliant driving but that there is a certain likelihood (based on the group compliance score) that this classification is erroneous). Scenarios requiring an improvement to a driving scenario scene may also benefit from image data from other sources, such as satellite imagery of the location.

Other event comprehension errors are based in an override driving scenario. FIG. 8 provides an example. To improve event comprehension, it may be helpful to store image data of the same location at different times, both when the override scenario is active and when it is not, so that the event comprehension system may learn to identify features of a scene that serve to override otherwise applicable traffic control devices.

As summarized in FIG. 12, some locations having unusually high rates of non-compliance may not be true positives, in the sense that these are locations at which drivers either intentionally or mistakenly ignore a traffic control device. In these situations, it may not be appropriate for a driving behavior monitoring system to learn to ignore an apparently applicable traffic control device, even though it would be emulating common human driving patterns. However, it may be warranted in certain cases for a user of a driving behavior monitoring system to ignore detections of non-compliant behavior. For example, a fleet may install stop signs on a private road that are only intended for certain types of vehicles but not others, although there is no articulable rule as to why. The fleet may decide to ignore non-compliant event detections from such locations. In contrast, the fleet may determine that it is especially important to observe traffic signs in certain locations where other drivers tend to ignore them. For example, a fleet may choose to emphasize stop sign violations that occur in a gated residential community. Even though the residents of the community may commonly ignore stop signs, the fleet may wish to enforce a higher standard of driving etiquette to the "end user" of its delivery services. This may be accomplished by weighting driving behaviors (non-compliant or compliant) more in an overall driver safety score for events associated with such locations.

At some locations, the traffic control device may be inappropriate to the setting. FIG. 10 illustrates an example in which a temporary stop sign was placed at a location that appears to be designed for a yield sign. Upon detecting that even otherwise compliant drivers tend to treat such a sign as a yield sign, a database may be updated to reflect this behavioral pattern. Such a database could be used by an autonomous driving system that must predict the actions of other vehicles on the road.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

23

24

What is claimed is:

1. A method of identifying training images, the method comprising:

determining a group compliance score for each driver group of a plurality of driver groups;

determining a location non-compliance score for a geographic location for a first driver group of the plurality of driver groups, wherein the group compliance score of the first driver group ranks among a top portion of the group compliance scores of the plurality of driver groups, wherein the geographic location is associated with the driving scenario;

selecting, image data associated with the geographic location based on the location non-compliance score exceeding a threshold value; and storing the image data in a machine learning database for training a machine learning model.

2. The method of claim 1, further comprising:

receiving event data associated with an event related to a driving behavior from a device coupled to a vehicle, wherein the event data is captured when the vehicle was driven through the geographic location by a driver.

3. The method of claim 2, wherein the event data comprises event image data associated with the driving behavior, and further comprising:

processing a portion of the event image data with a neural network to produce inference data; and detecting that the geographic location is associated with the driving scenario based on the inference data.

4. The method of claim 3, further comprising:

determining that the detection of the driving scenario at the geographic location was erroneous;

storing, in the machine learning database, the event image data together with an indication that the event image data does not reflect an example of the driving scenario; and training the neural network with the machine learning database to detect the driving scenario.

5. The method of claim 3, wherein the driving scenario is a stop sign scenario; wherein detecting that the geographic location is associated with a stop sign scenario is based at least in part on a prediction by the neural network that the event image data contains an image of a traffic sign and that the traffic sign is a stop sign; and wherein determining that the detection of the stop sign scenario was erroneous comprises determining that the traffic sign is not a stop sign.

6. The method of claim 3, further comprising:

presenting a user of a safety management system with an option to ignore detections of non-compliant driving behaviors at the geographic location.

7. The method of claim 3, further comprising:

presenting a user of a safety management system with an option to emphasize detections of non-compliant driving behaviors at the geographic location.

8. The method of claim 2, further comprising:

receiving a characterization of the driving behavior exhibited by the driver at the geographic location based on the event data.

9. The method of claim 8, wherein the event data comprises event image data associated with the driving behavior, and wherein the driving behavior is characterized as non-compliant and further comprising:

determining that characterization of the driving behavior as non-compliant was erroneous;

storing, in the machine learning database, the event image data together with an indication that the event image data does not correspond to an example of non-compliant driving behavior; and training a machine learning model with the machine learning database to characterize driving behavior as compliant or non-compliant.

10. The method of claim 2, wherein the driver is a member of the first driver group.

11. The method of claim 2, wherein the event data comprises event image data associated with the driving behavior, and further comprising:

storing, in the machine learning database, the event image data together with an indication that the event image data corresponds to a true positive example of non-compliant driving behavior; and training a machine learning model with the machine learning database to characterize driving behavior as compliant or non-compliant.

12. The method of claim 1, further comprising:

storing, in the machine learning database, event image data together with an indication that the event image data corresponds to a true positive or a false positive example of non-compliant driving behavior; and training the machine learning model with the machine learning database to characterize a driving behavior as compliant or non-compliant.

13. The method of claim 1, wherein selecting the image data is further based on:

determining that the location non-compliance score for the geographic location is higher than at least one of:

a group non-compliance score, wherein the group non-compliance score is a complement to the group compliance score; or location non-compliance scores associated with the first driver group at other geographic locations.

14. The method of claim 1, wherein the driving scenario is a stop sign scenario, and further comprising:

detecting, based at least in part on the event data, that the vehicle came to a complete stop;

and wherein determining that the characterization of the driving behavior as non-compliant was erroneous is based at least in part on the detection that the vehicle came to a complete stop.

15. The method of claim 1, wherein the driving scenario is a stop sign scenario, and further comprising:

determining, based at least in part on the event data, that the vehicle was not expected to come to a complete stop in the presence of a detected stop sign because the stop sign did not apply to the direction that the vehicle travelled through an intersection near the detected stop sign.

16. The method of claim 1, wherein the driving scenario is a stop sign scenario, and further comprising:

determining, based at least in part on the event data, that the vehicle was not expected to come to a complete stop in the presence of a detected stop sign because there was a temporary override of traffic rules near the detected stop sign.

17. A computer program product comprising a non-transitory computer-readable medium having instructions stored thereon, the instructions being executable by one or more processors configured to:

determine a group compliance score for each driver group of a plurality of driver groups;

determine a location non-compliance score for a geographic location for a first driver group of the plurality of driver groups, wherein the group compliance score of the first driver group ranks among a top portion of the group compliance scores of the plurality of driver groups, wherein the geographic location is associated with the driving scenario;

select image data associated with the geographic location based on the location non-compliance score exceeding a threshold value; and store the image data in a machine learning database for training a machine learning model.

\* \* \* \* \*